(12) United States Patent
Ramadhane et al.

(10) Patent No.: US 12,217,253 B2
(45) Date of Patent: Feb. 4, 2025

(54) OFFLINE BIDIRECTIONAL TRANSACTION AND SECURE SYSTEM

(71) Applicant: International Business Machines Corporation, Armonk, NY (US)

(72) Inventors: Mohamed Zouhaier Ramadhane, Azcapotzalco (MX); Cesar Augusto Rodriguez Bravo, Alajuela (CR); Susanna Ting, Markham (CA); Juan Manuel Avalos Vega, Zapopan (MX); Daniela Ofelia Rojas Barrientos, Naucalpan de Juarez (MX)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/313,139

(22) Filed: May 6, 2021

(65) Prior Publication Data

US 2022/0358494 A1 Nov. 10, 2022

(51) Int. Cl.
*G06Q 20/38* (2012.01)
*G06F 21/45* (2013.01)
(Continued)

(52) U.S. Cl.
CPC ........... *G06Q 20/385* (2013.01); *G06F 21/45* (2013.01); *G06K 7/1417* (2013.01);
(Continued)

(58) Field of Classification Search
None
See application file for complete search history.

(56) References Cited

U.S. PATENT DOCUMENTS

| 8,924,712 B2 | 12/2014 | Varadarajan |
| 11,321,709 B1 * | 5/2022 | Kolchin ............... G06Q 20/108 |

(Continued)

FOREIGN PATENT DOCUMENTS

| EP | 3608859 A1 * | 2/2020 | ........... G06Q 20/341 |
| JP | 2003527703 A | 9/2003 | |

(Continued)

OTHER PUBLICATIONS

Dhawan, S., "RBI to allow offline payments using cards, mobile devices—Here is how it works", https://financialexpress.com, Feb. 5, 2021. (Year: 2021).*

(Continued)

*Primary Examiner* — Clay C Lee
(74) *Attorney, Agent, or Firm* — Michael A. Petrocelli

(57) ABSTRACT

In an approach for enabling communication between offline devices to perform secure transaction, a processor sends information in an optically recognizable first code including a response type, an identity of the first device and a type of optical reader associated with the first device. A processor receives encoded information in an optically recognizable second code. A processor extracts a user identifier and the one-time password associated with the registered second device. A processor determines that a user certificate associated with the user identifier exists in a local repository. A processor validates the one-time password associated with the registered second device with the user certificate using a public certificate associated with the first device, the one-time password associated with the registered second device and the one-time password seed. A processor authenticates the user.

20 Claims, 8 Drawing Sheets

(51) Int. Cl.
| | |
|---|---|
| *G06K 7/14* | (2006.01) |
| *G06K 19/06* | (2006.01) |
| *G06Q 20/20* | (2012.01) |
| *G06Q 20/32* | (2012.01) |
| *G06Q 20/36* | (2012.01) |
| *G06Q 20/40* | (2012.01) |
| *H04L 9/40* | (2022.01) |

(52) U.S. Cl.
CPC .. *G06K 19/06037* (2013.01); *G06K 19/06112* (2013.01); *G06Q 20/208* (2013.01); *G06Q 20/3274* (2013.01); *G06Q 20/3276* (2013.01); *G06Q 20/3674* (2013.01); *G06Q 20/3821* (2013.01); *G06Q 20/3829* (2013.01); *G06Q 20/405* (2013.01); *H04L 63/0823* (2013.01); *H04L 63/0846* (2013.01); *H04L 63/0853* (2013.01); *G06Q 20/326* (2020.05)

(56) References Cited

U.S. PATENT DOCUMENTS

| | | | | |
|---|---|---|---|---|
| 2012/0324242 | A1* | 12/2012 | Kirsch | G06F 21/6245 713/189 |
| 2013/0263211 | A1* | 10/2013 | Neuman | G06Q 20/322 726/1 |
| 2015/0278795 | A1* | 10/2015 | Jiang | G06Q 20/3823 705/44 |
| 2016/0140329 | A1* | 5/2016 | Boivie | G06F 21/32 726/18 |
| 2016/0373428 | A1 | 12/2016 | Shi | |
| 2017/0012444 | A1 | 1/2017 | Kamei | |
| 2017/0013416 | A1 | 1/2017 | Daoud | |
| 2017/0330168 | A1 | 11/2017 | Park | |
| 2019/0130386 | A1* | 5/2019 | Bhat | G06Q 20/40 |
| 2021/0073359 | A1* | 3/2021 | Boodaei | H04L 9/0844 |
| 2023/0273987 | A1* | 8/2023 | Goodsitt | H04L 9/3226 726/18 |

FOREIGN PATENT DOCUMENTS

| | | | | |
|---|---|---|---|---|
| KR | 101711378 | B1 * | 3/2017 | G06Q 30/06 |
| KR | 20210034405 | A * | 3/2021 | G06Q 20/32 |
| WO | 2017101584 | A1 | 6/2017 | |

OTHER PUBLICATIONS

"Bar Code 101", Global Trade Item Number Info, Feb. 17, 2015, 8 pages, <https://www.gtin.info/barcode-101/>.

"Cash accounts for 90% of consumer transactions in Mexico (PYMNTS 2018)", Cashmatters, Jan. 26, 2018, 4 pages, <https://www.cashmatters.org/blog/cash-accounts-90-consumer-transactions-mexico-pymnts-2018/>.

"Cashi—More than Cash", Cashi, Printed Feb. 23, 2020, 10 pages, <https://cashi.com.mx>.

"Google 2-Step Verification", Google, Printed Feb. 19, 2021, 6 pages, <https://www.google.com/landing/2step/>.

"In Mexico There Are 80.6 Million Internet Users And 86.5 Million Cellular Phone Users: ENDUTIH 2019", Federal Institute of Telecommunications, Feb. 17, 2020, 13 pages.

"Leading problems encountered by internet users while browsing in Mexico in 2018", Statista, Apr. 8, 2020, 2 pages, <https://www.statista.com/statistics/809579/problems-internet-use-mexico/>.

"Offline payments", Adyen Docs, Printed Feb. 5, 2021, 2 pages, <https://docs.adyen.com/point-of-sale/offline-payments>.

"One-time password", Wikipedia, Feb. 15, 2021, 7 pages, <https://en.wikipedia.org/wiki/One-time_password>.

"Prepaid Services", Arcus Solutions, Printed Feb. 23, 2020, 4 pages, <www.arcusfi.com/prepaid-serives/>.

"Protect your account with 2-Step Verification", Google Account, Printed Feb. 19, 2021, 2 pages, <https://support.google.com/accounts/answer/185839>.

"Speed performance and info about outage, service down or problem" Fing, Printed Feb. 22, 2021, 4 pages, <https://app.fing.com/internet/place/Mexico/Mexico%20City/Mexico%20City>.

"The Financial Inclusion Puzzle in Mexico", IMCO, Jan. 21, 2020, 8 pages.

"Walmart Cashi: More than cash, the first app in the self-service sector that revolutionizes the form of payment in Mexico", Walmart Mexico, Printed Feb. 23, 2021, 11 pages.

Al-Ghaili, "Efficient Implementation of 2D Barcode Verification Algorithm for IoT Applications", 2019 IEEE 5th Intl Conference on Big Data Security on Cloud (BigDataSecurity), Proceedures of the IEEE Intl Conference on High Performance and Smart Computing (HPSC), and IEEE Intl Conference on Intelligent Data and Security (IDS), Washington DC, USA, May 27-29, 2019, 6 pages, <https://ieeexplore.ieee.org/abstract/document/8818979>.

Chow et al., "Authentication and Transaction Verification using QR Codes with a Mobile Device", ResearchGate, Nov. 2016, 15 pages, <https://www.researchgate.net/publication/309816698_Authentication_and_Transaction_Verification_Using_QR_Codes_with_a_Mobile_Device>.

Dhawan Sunil, "RBI to allow offline payments using cards, mobile devices—Here is how it works", The Financial Express, Aug. 6, 2020, 10 pages, <https://www.financialexpress.com/money/rbi-to-allow-offline-payments-using-cards-mobile-devices-here-is-how-it-works/2047083/>.

Frankenfield, Jake, "Personally Identifiable Information (PII) Definition", Investopedia, Jan. 7, 2021, 2 pages, <https://www.investopedia.com/terms/p/personally-identifiable-information-pii.asp>.

Garcia, Ana Karen, "7 Facts About Internet Users in Mexico", The Economist, Apr. 14, 2019, 58 pages.

Hayes, Adam, "Point of Sale (POS) Definition", Investopedia, Oct. 26, 2020, 8 pages, <https://www.investopedia.com/terms/p/point-of-sale.asp>.

Hayes, Adam, "Quick Response (QR) Code Definition", Investopedia, Nov. 30, 2020, 8 pages, <https://www.investopedia.com/terms/q/quick-response-qr-code.asp>.

Kagan, Julia, "PayPal Definition", Investopedia, Nov. 25, 2020, 9 pages, <https://www.investopedia.com/terms/p/paypal.asp>.

Navis et al., "The Puzzle of Financial Inclusion in Mexico: A Closable Gap?", Center for Global Development, Jan. 14, 2020, 17 pages, <https://www.cgdev.org/publication/puzzle-financial-inclusion-mexico-closeable-gap>.

Saldana, Ivette, "El 80% de los mexicanos pagan con efectivo, revela estudio", El Universal, Nov. 3, 2020, 5 pages, <https://www.eluniversal.com.mx/cartera/el-80-de-los-mexicanos-pagan-con-efectivo-revela-estudio>.

Shamal et al., "Secure Authentication for Online Banking Using QR Code", International Journal of Emerging Technology and Advanced Engineering, vol. 4, Issue 3, Mar. 2014, 4 pages, <http://citeseerx.ist.psu.edu/viewdoc/download?doi=10.1.1.637.8087&rep=rep1&type=pdf>.

Tardi et al., "Near Field Communication (NFC) Definition", Investopedia, Sep. 23, 2020, 9 pages, ,<https://www.investopedia.com/terms/n/near-field-communication-nfc.asp>.

Gremlin, "Cost of Downtime for Top US eCommerce Sites", accessed on May 12, 2023, 4 pages.

imco.org, "Energy and Environment", Public Policy Research Center, accessed on Jun. 30, 2023, 2 pages, https://imco.org.mx/el-rompecabezas-de-la-inclusion-financiera-en-mexico/, (Translated).

Mordor Intelligence, Mobile Payments Market Size & Share Analysis—Growth Trends & Forecasts (2023-2028), Accessed on May 12, 2023, 6 pages, https://www.mordorintelligence.com/industry-reports/mobile-payment-market.

Naghavi, "State of the Industry Report on Mobile Money", GSM Association, 2019 State of the Industry Report on Mobile Money, (2019), 72 pages.

Saldana, "80% of Mexicans pay with cash, study reveals", El Universal, Nov. 3, 2020, 14 pages, https://www.eluniversal.com.mx/cartera/el-80-de-los-mexicanos-pagan-con-efectivo-revela-estudio, (Translated).

* cited by examiner

OFFLINE BIDIRECTIONAL TRANSACTION AND SECURE SYSTEM

BACKGROUND

The present disclosure relates generally to the field of mobile payment, and more particularly to enabling communication between offline devices to perform secure transaction.

Near-Field-Communication (NFC) is a set of communication protocols for communication between two electronic devices over a short distance. An NFC technology can be used for mobile payment. Magnetic secure transmission is another technology that may generate a changing magnetic field over a short period by alternating current through an inductive loop. Magnetic secure transmission may emulate a sliding movement of a credit or a debit card through a point of sale. A mobile wallet may be a virtual wallet that stores payment card information on a mobile device. A mobile wallet can be a convenient way for a user to make in-store payments and can be used at merchants listed with the mobile wallet service provider. A mobile wallet can be installed on a smartphone or can be an existing built-in feature of a smartphone. A mobile wallet may store credit card, debit card, coupon, or reward card information.

SUMMARY

Aspects of an embodiment of the present disclosure disclose an approach for enabling communication between offline devices to perform secure transaction. A processor, in response to receiving a request from a registered user associated with the registered second device, sends information in an optically recognizable first code including a response type, an identity of the first device and a type of optical reader associated with the first device. A processor receives encoded information in an optically recognizable second code, generated using information including the optically recognizable first code, a one-time password seed and the type of optical reader associated with the first device, an identity of the second device and a one-time password generated using a private key of the registered second device. A processor, in response to decoding the encoded information in the optically recognizable second code received, extracts a user identifier and the one-time password associated with the registered second device. A processor, in response to a determination the backend is not online, determines that a user certificate associated with the user identifier exists in a local repository. A processor validates the one-time password associated with the registered second device with the user certificate using a public certificate associated with the first device, the one-time password associated with the registered second device and the one-time password seed. A processor authenticates the user.

DETAILED DESCRIPTION

The present disclosure is directed to systems and methods for enabling communication between offline devices to perform secure transaction.

Embodiments of the present disclosure recognize a need for a mobile application to process payment in a point of sale without internet connection among the transaction parties. Embodiments of the present disclosure disclose a protocol that enables communication between offline devices to perform secure transaction. Embodiments of the present disclosure disclose sharing information through optical codes. Embodiments of the present disclosure disclose generating in a provider device an optical code including a one-time password built from a private certificate as well as a timestamp. The provider device may share the one-time password with a user. The user may scan the optical code to obtain the information needed to respond to the provider device request. Embodiments of the present disclosure disclose encode the information from the provider device and generate another optical code in a user device. Differently from the provider device, the user device may generate such code from the user's certificates as well as the one-time password received from the provider device. The provider device may scan the user's optical code so that the information can be sent and processed in a backend server once an internet connection can be granted. Embodiments of the present disclosure disclose an enrollment process between a provider device, a user, a user device and a backend server in order to enroll all the parties in the system.

Figure 1:
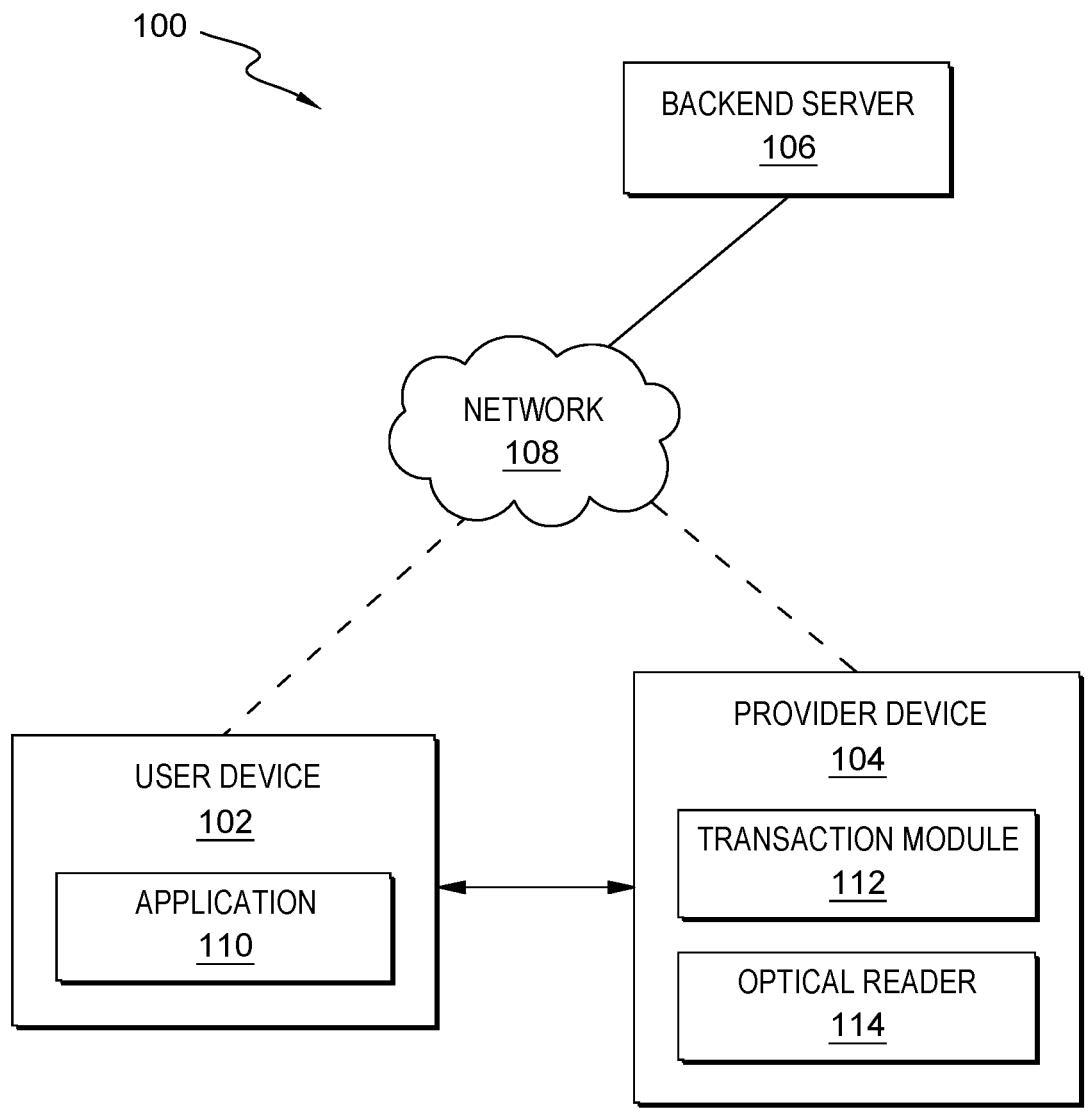
FIG. 1 is a functional block diagram illustrating an offline bidirectional transaction environment, in accordance with an embodiment of the present disclosure.

The present disclosure will now be described in detail with reference to the Figures. FIG. 1 is a functional block diagram illustrating offline bidirectional transaction environment, generally designated 100, in accordance with an embodiment of the present disclosure.

In the depicted embodiment, offline bidirectional transaction environment 100 includes user device 102, provider device 104, backend server 106, and network 108.

In an embodiment, user device 102 is a mobile device. The mobile device may include a camera to read an optical code. User device 102 may be a laptop computer, a netbook computer, a tablet computer, a personal digital assistant (PDA), a smart phone, or a cell phone. In general, user device 102 may be any electronic device or computing system capable of sending and receiving data and communicating with provider device 104. User device 102 may include components, as depicted and described in further detail with respect to FIG. 6.

In various embodiments of the present disclosure, provider device 104 may be a hand-hold device, a laptop computer, a tablet computer, a netbook computer, a personal computer (PC), a desktop computer, a mobile phone, a smartphone, a smart watch, a wearable computing device, a personal digital assistant (PDA), or a server. In another embodiment, the computing device 104 represents a computing system utilizing clustered computers and components to act as a single pool of seamless resources. In general, provider device 104 can be any computing device or a combination of devices with access to transaction module 112 and network 108 and is capable of processing program instructions and executing transaction module 112, in accordance with an embodiment of the present disclosure. Provider device 104 may include internal and external hardware components, as depicted and described in further detail with respect to FIG. 6.

In various embodiments of the present disclosure, backend server 106 may be a management server, a web server, or any other electronic device or computing system capable of processing program instructions and receiving and sending data. In some embodiments, backend server 106 may be a laptop computer, a tablet computer, a netbook computer, a personal computer (PC), a desktop computer, or any programmable electronic device. In other embodiments, backend server 106 may represent a server computing system utilizing multiple computers as a server system, such as in a cloud computing environment. In another embodiment, backend server 106 represents a computing system utilizing clustered computers and components to act as a single pool of seamless resources. Backend server 106 may include internal and external hardware components, as depicted and described in further detail with respect to FIG. 6.

Further, in the depicted embodiment, user device 102 may include application 110. In an example, application 110 may be a mobile application. In another example, application 110 may be an operating system specific application. In an example, application 110 may be a mobile wallet payment application, e.g., a mobile wallet. A mobile wallet may be a virtual wallet that stores payment card information on a mobile device. A mobile wallet can be a convenient way for a user to make in-store payments and can be used at merchants listed with the mobile wallet service provider. A mobile wallet can be installed on a smartphone or can be an existing built-in feature of a smartphone. A mobile wallet may store credit card, debit card, coupons, or reward cards information. Once the mobile wallet is installed and the user inputs payment information, the mobile wallet may store information by linking a personal identification format such as a number or key, QR code or an image of the owner to each card that is stored. A user may install application 102 in user device 102. During the installation of application 110, application 110 may request the user for registration information, e.g., an email address, a user identifier, a membership identification, personal information. The user may enter all the requested information for the registration process. The user can disable this feature or must opt in to have their user information be obtained. The user is in control of what type of information is going to be collected and aware of how that information is going to be used. After user device 102 receives the information entered from the user, user device 102 may confirm and send the registration data to backend server 106. Backend server 106 may receive, validate, and store the registration data. Backend server 106 may generate a key pair for the user, for example, asymmetric keys based on various algorithms. Backend server 106 may store a public key of the user. Backend server 106 may define a business rule to determine a user offline privilege. For example, the business rule can allow backend server 106 to define a risk management contingency for offline uses cases. In the use case of a mobile wallet, backend server 106 may define for example that a user needs to have at least a certain amount of money (e.g., 200 dollars) in the mobile wallet to get access to offline payment and may limit any offline payment to a maximum amount (e.g., 50 dollars). Backend server 106 may define an access to an event of transaction. For example, backend server 106 may define that, if a user has already subscribed (or paid for an event), the user may be entitled to an offline privilege. Backend server 106 may share the public key of the user to enable offline privilege for the user. Backend server 106 may store a user identity and the public key. Backend server 106 may update the user information as soon as possible to add or remove the users' offline privilege, by removing or adding public keys to provider device 104. Backend server 106 may send the private key to user device 102. Once user device 102 receives the private key, user device 102 may store the private key and activate application 110.

In the depicted embodiment, provider device 104 may include transaction module 112 and optical reader 114. In one or more embodiments, optical reader 114 is configured to scan and read an optical code. In an example, optical reader can be a camera. In an example, the optical code may be a bar code. In another example, the optical code may be a QR (quick response) code. In another example, optical reader 114 can read any optically recognizable code.

In one or more embodiments, transaction module 112 is configured to send information in an optically recognizable code by provider device 104 to user device 102. Transaction module 112 may receive a request from a user associated with user device 102. Transaction module 112 may generate the optically recognizable code including the information of a response type, an identity of provider device 104 and a type of optical reader 114 associated with provider device 104. For example, provider device 104 may have different type of optical reader 114. The identity of the transaction may be dynamic, e.g., time based one-time password. The information may be used as a seed of the one-time password for user device 102. When a user requires to perform a transaction, transaction module 112 may generate in provider device 104 a one-time password built from a private certificate as well as a timestamp. Transaction module 112 may send the one-time password to user device 102. In return user device 102 may scan the optically recognizable code from provide device 104 to see the information that provider device 104 is requesting from the user. In an example, user device 102 may scan the optical code with a built-in camera. User device 102 may extract the one-time password seed and the type of optical capability of provider device 104. User device 102 may encode the information from provider device 104 and may generate another optical code. Differently from provider device 104, user device 102 may generate such code from the user's certificates as well as the one-time password received from provider device 104. User device 102 may generate an optical code by using a private key (e.g., obtained during enrollment and activation of user device 102 to generate a one-time password, based on the seed provided by provider device 104). User device 102 may encode the information based on the capability of provider device 104. In an example, user device 102 may encode an identity and the generated one-time password depending on the capability of provide device 104. In another example, user device 102 may generate multiple optical codes.

In one or more embodiments, transaction module 112 is configured to receive, from user device 102, encoded information in an optically recognizable second code. User device 102 may generate the optically recognizable second code using information including the optically recognizable first code, a one-time password seed and the type of optical reader associated with provider device 104. The optically recognizable second code may also include an identity of user device 102 and a one-time password generated using a private key of the user device 102. Provider device 104 may scan the optical code generated from user device 102.

In one or more embodiments, transaction module 112 is configured to extract a user identifier and the one-time password associated with user device 102 in response to decoding the encoded information in the optically recognizable second code received from user device 102. Transaction module 112 may decode the optical code including the user identifier and the one-time password generated in user device 102.

In one or more embodiments, transaction module 112 is configured to determine whether backend server 106 is online or not. Transaction module 112 may determine whether backend server 106 is reachable or not. If transaction module 112 determines that backend server 106 is not online or unreachable, transaction module 112 may determine whether an amount of the associated transaction exceeds a predetermined offline limit. The predetermined offline limit may be a predefined business rule based on risk management. In an example, the predetermined offline limit is a predefined maximum amount that a transaction can be done offline. In another example, the predetermined offline limit can be other suitable limit for an offline transaction to minimize an offline transaction risk. If transaction module 112 determines that the amount of the associated transaction exceeds the predetermined offline limit, transaction module 112 may cancel the transaction. If transaction module 112 determines that the amount of the associated transaction does not exceed the predetermined offline limit, transaction module 112 may load user information from a local repository in provider device 104. In an example, transaction module 112 may use a user identifier to check whether a local public key of user device 102 exists in provider device 104. Transaction module 112 may determine whether the user certificate associated with the user identifier exists in the local repository. If transaction module 112 determines that the user certificate associated with the user identifier does not exist in the local repository (e.g., the user is not eligible, or the user does not have the necessary funds, or provide device 104 has not received the user information yet), transaction module 112 may cancel the transaction. If transaction module 112 determines that the user certificate associated with the user identifier exists in the local repository, transaction module 112 may validate the one-time password associated with user device 102 with the user certificate using a public certificate associated with provider device 104.

If transaction module 112 determines that backend server 106 is online and reachable, transaction module 112 may initiate a process on backend server 106 to authenticate the user and validate an associated transaction by sending information to backend server 106. For example, transaction module 112 may send to backend server the information including one-time password seed generated from provider device 104, the user identifier, the one-time password associated with user device 102, and additional information associated with the associated transaction (e.g., the amount of transaction). Backend server 106 may use the received information from provider device 104 to authenticate the user and provider device 104. For example, backend server 106 may have an exchanged key during the enrollment process and based on: a user identifier, a one-time password from provider device 104, and a one-time password from user device 102. Backend server 106 may validate the transaction by applying any predefined business rule. For example, in case of a mobile wallet, a predefined business rule can be whether the user has enough funds for the transaction. Once the transaction is processed, and in case the transaction results in the user losing its offline privilege, backend server 106 may request provider device 104 to delete the user public key from a local storage, to disable offline privilege. Transaction module 112 may receive a status of the associated transaction from backend server 106. For example, backend server 106 may notify provider device 104 of the status of the transaction (e.g., success, funds insufficient, etc.)

In one or more embodiments, transaction module 112 is configured to validate a one-time password associated with user device 102 with a user certificate. Transaction module 112 may use a public certificate associated with provider device 104, a one-time password associated with user device 102, and a one-time password seed from provide device 104 to validate the one-time password associated with user device 102 with the user certificate.

In one or more embodiments, transaction module 112 is configured to authenticate the user. After validating the user certificate, transaction module 112 may authenticate user device 102 and may access the user information in provider device 104 (e.g., last known balance). Transaction module 112 may validate the associated transaction using a set of predetermined business rules. For example, based on all the information provider device 104 have, transaction module 112 may apply a business rule to decide if the transaction is valid (e.g., enough funds or not). If transaction module 112 determines that the transaction is valid, transaction module 112 may register the associated transaction. Transaction module 112 may update the local information about the user (e.g., the transaction and the new balance). Transaction module 112 may store all the evidence to send to backend server 106 when backend server 106 is back online. Transaction module 112 may store information associated with the associated transaction. The information associated with the associated transaction may include updated local information associated with the user and a new balance. Transaction module 112 may send the associated transaction to backend server 106 when backend server 106 is back online.

Figure 2A:
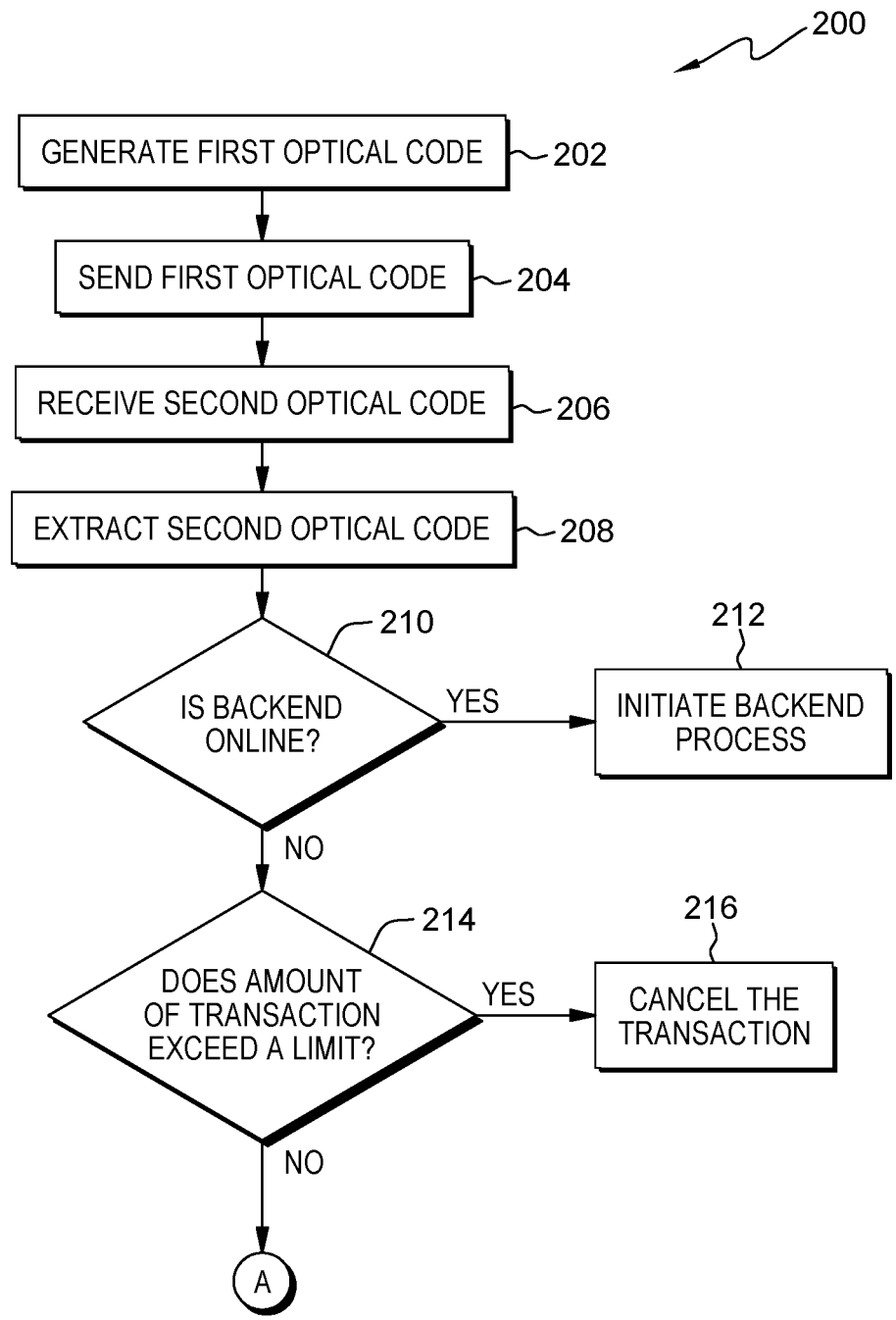
FIGS. 2A-2B are a flowchart depicting operational steps of a transaction module within a provider device of FIG. 1, in accordance with an embodiment of the present disclosure.
Figure 2B:
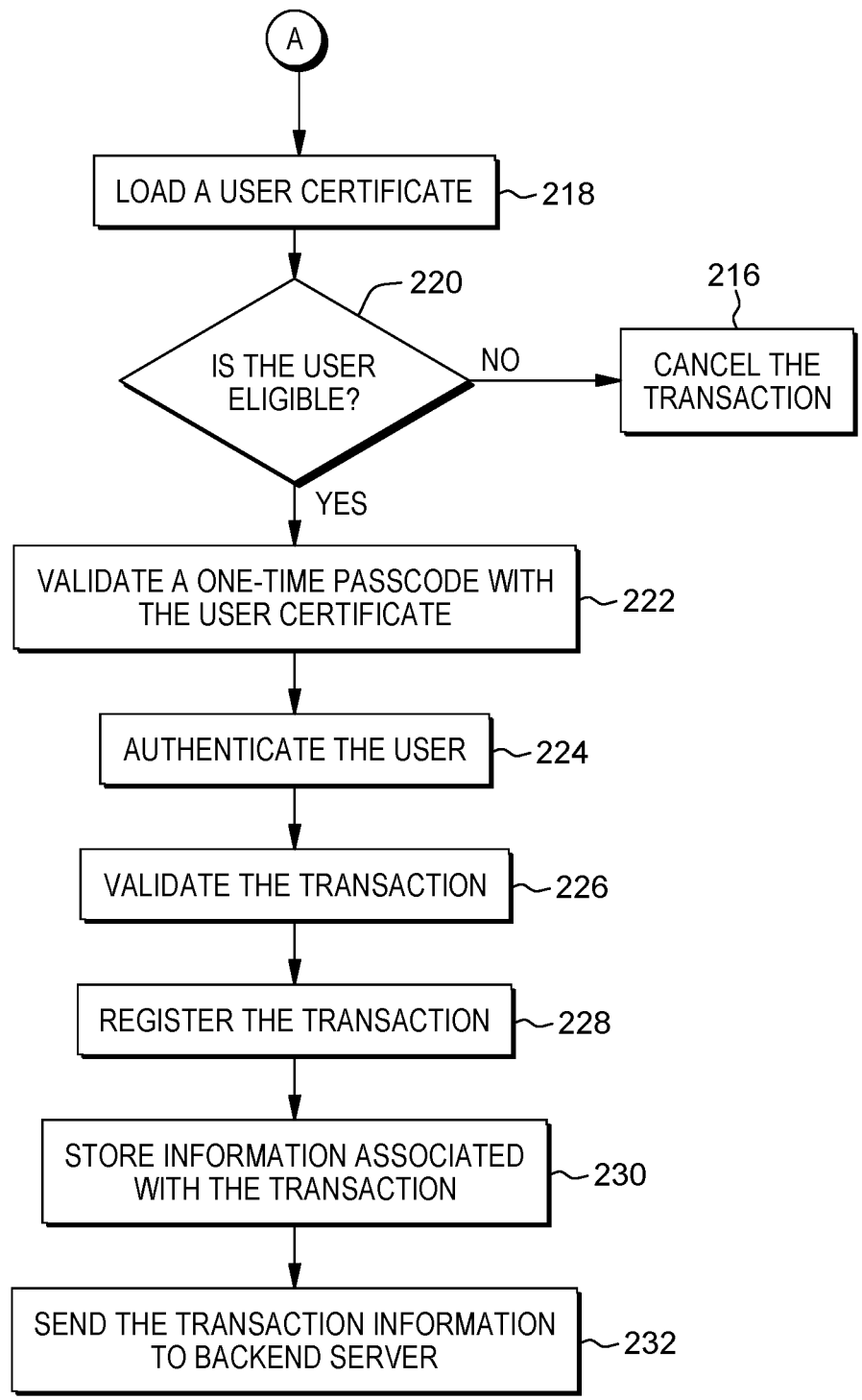

FIGS. 2A-2B are a flowchart 200 depicting operational steps of transaction module 112 of provider device 104 in accordance with an embodiment of the present disclosure.

Transaction module 112 operates to send, by provider device 104 to user device 102, information in an optically recognizable first code including a response type, an identity of the first device and a type of optical reader associated with the first device, in response to receiving a request from a user associated with user device 102. Transaction module 112 operates to receive, from user device 102, encoded information in an optically recognizable second code, generated using information including the optically recognizable first code, a one-time password seed and the type of optical reader associated with the first device, an identity of the second device and a one-time password generated using a private key of the registered second device. Transaction module 112 operates to extract a user identifier and the one-time password associated with user device 102 in response to decoding the encoded information in the optically recognizable second code received. Transaction module 112 operates to, in response to a determination backend server 106 is at least one of not online and unreachable, determine that a user certificate associated with the user identifier exists in a local repository. Transaction module 112 operates to validate the one-time password associated with user device 102 with the user certificate using a public certificate associated with the first device, the one-time password associated with the registered second device, and the one-time password seed. Transaction module 112 operates to authenticate the user.

In step 202, transaction module 112 generates a first optical code. Transaction module 112 may generate the first optical code when provide device 104 receives a transaction request from a user associated with user device 102. The first optical code may an optically recognizable code. In an example, the first optical code may be a QR code. In another example, the optical code may be a bar code. In another example yet, the optical code may be any other optically recognizable code. The first optical code may include the information of a response type, an identity of provider device 104 and a type of optical reader 114 associated with provider device 104. For example, provider device 104 may have different type of optical reader 114. The identity of provider device 104 may be dynamic, e.g., time based one-time password. The information may be used as a seed of the one-time password for user device 102.

In step 204, transaction module 112 sends the first optical code with the information in the first optical code by provider device 104 to user device 102. When a user requires to perform a transaction, transaction module 112 may generate in provider device 104 a one-time password built from a private certificate as well as a timestamp. Transaction module 112 may send the one-time password to user device 102. In return user device 102 may scan the first optical code from provide device 104 to obtain the information that provider device 104 is requesting from the user. In an example, user device 102 may scan the first optical code with a built-in camera. User device 102 may extract the one-time password seed and the type of optical capability of provider device 104. User device 102 may encode the information from provider device 104 and may generate a second optical code. Differently from provider device 104, user device 102 may generate the second optical code from the user's certificates as well as the one-time password received from provider device 104. User device 102 may generate the second optical code by using a private key (e.g., obtained during enrollment and activation of user device 102 to generate a one-time password, based on the seed provided by provider device 104). User device 102 may encode the information based on the capability of provider device 104. In an example, user device 102 may encode an identity and the generated one-time password depending on the capability of provide device 104. In another example, user device 102 may generate multiple optical codes.

In step 206, transaction module 112 receives the encoded information in the second optical code from user device 102. User device 102 may generate the second optical code using information of the first optical code from provider device 104, a one-time password seed and the type of optical reader associated with provider device 104. The second optical code may also include an identity of user device 102 and a one-time password generated using a private key of the user device 102. Provider device 104 may scan and read the second optical code generated from user device 102.

In step 208, transaction module 112 extracts the user identifier and the one-time password associated with user device 102 in response to decoding the encoded information in the optically recognizable second code received from user device 102. Transaction module 112 may decode the optical code including the user identifier and the one-time password generated in user device 102.

In decision 210, transaction module 112 determines whether backend server 106 is online or not. If backend server 106 is online (decision 210, "YES" branch), in step 212, transaction module 112 initiates a process on backend server 106 to authenticate the user and validate an associated transaction by sending information to backend server 106. For example, transaction module 112 may send to backend server the information including one-time password seed generated from provider device 104, the user identifier, the one-time password associated with user device 102, and additional information associated with the associated transaction (e.g., the amount of transaction). Backend server 106 may use the received information from provider device 104 to authenticate the user and provider device 104. For example, backend server 106 may have an exchanged key during the enrollment process and based on: a user identifier, a one-time password from provider device 104, and a one-time password from user device 102. Backend server 106 may validate the transaction by applying any predefined business rule. For example, in case of a mobile wallet, a predefined business rule can be whether the user has enough funds for the transaction. Once the transaction is processed, and in case the transaction results in the user losing its offline privilege, backend server 106 may request provider device 104 to delete the user public key from a local storage, to disable offline privilege. Transaction module 112 may receive a status of the associated transaction from backend server 106. For example, backend server 106 may notify provider device 104 of the status of the transaction (e.g., success, funds insufficient, etc.)

If backend server 106 is not online or unreachable (decision 210, "NO" branch), in decision 214, transaction module 112 determines whether an amount of the associated transaction exceeds a predetermined offline limit. The predetermined offline limit may be a predefined business rule based on risk management. In an example, the predetermined offline limit is a predefined maximum amount that a transaction can be done offline. In another example, the predetermined offline limit can be other suitable limit for an offline transaction to minimize an offline transaction risk. If transaction module 112 determines that the amount of the associated transaction exceeds the predetermined offline limit (decision 214, "YES" branch), in step 216, transaction module 112 cancels the transaction. If transaction module 112 determines that the amount of the associated transaction does not exceed the predetermined offline limit (decision 214, "NO" branch), in step 218, transaction module 112 loads user information (e.g., a user certificate) from a local repository in provider device 104. In an example, transaction module 112 may use a user identifier to check whether a local public key of user device 102 exists in provider device 104. Transaction module 112 may determine whether the user certificate associated with the user identifier exists in the local repository.

In decision 220, transaction module 112 determines whether the user is eligible for the transaction or not (e.g., whether the user certificate associated with the user identifier exist in the local repository, whether the user has the necessary funds, whether provide device 104 has received the user information). If transaction module 112 determines that the user is not eligible for the transaction (decision 220, "NO" branch), in step 216, transaction module 112 cancels the transaction. If transaction module 112 determines that the user is eligible for the transaction (decision 220, "YES"

branch), in step 222, transaction module 112 validates a one-time password associated with user device 102 with the user certificate using a public certificate associated with provider device 104. Transaction module 112 may validate the one-time password associated with user device 102 with a user certificate. Transaction module 112 may use a public certificate associated with provider device 104, a one-time password associated with user device 102, and a one-time password seed from provide device 104 to validate the one-time password associated with user device 102 with the user certificate.

In step 224, transaction module 112 authenticates the user. After validating the user certificate, transaction module 112 may authenticate user device 102 and may access the user information in provider device 104 (e.g., last known balance). In step 226, transaction module 112 validates the associated transaction using a set of predetermined business rules. For example, based on all the information provider device 104 has, transaction module 112 may apply a business rule to decide if the transaction is valid (e.g., enough funds or not). If transaction module 112 determines that the transaction is valid, in step 228, transaction module 112 registers the associated transaction. Transaction module 112 may update the local information about the user (e.g., the transaction and the new balance). In step 230, transaction module 112 stores all the evidence to send to backend server 106 when backend server 106 is back online. Transaction module 112 may store information associated with the associated transaction. The information associated with the associated transaction may include updated local information associated with the user and a new balance. In step 232, transaction module 112 sends the associated transaction information to backend server 106 when backend server 106 is back online.

Figure 3:
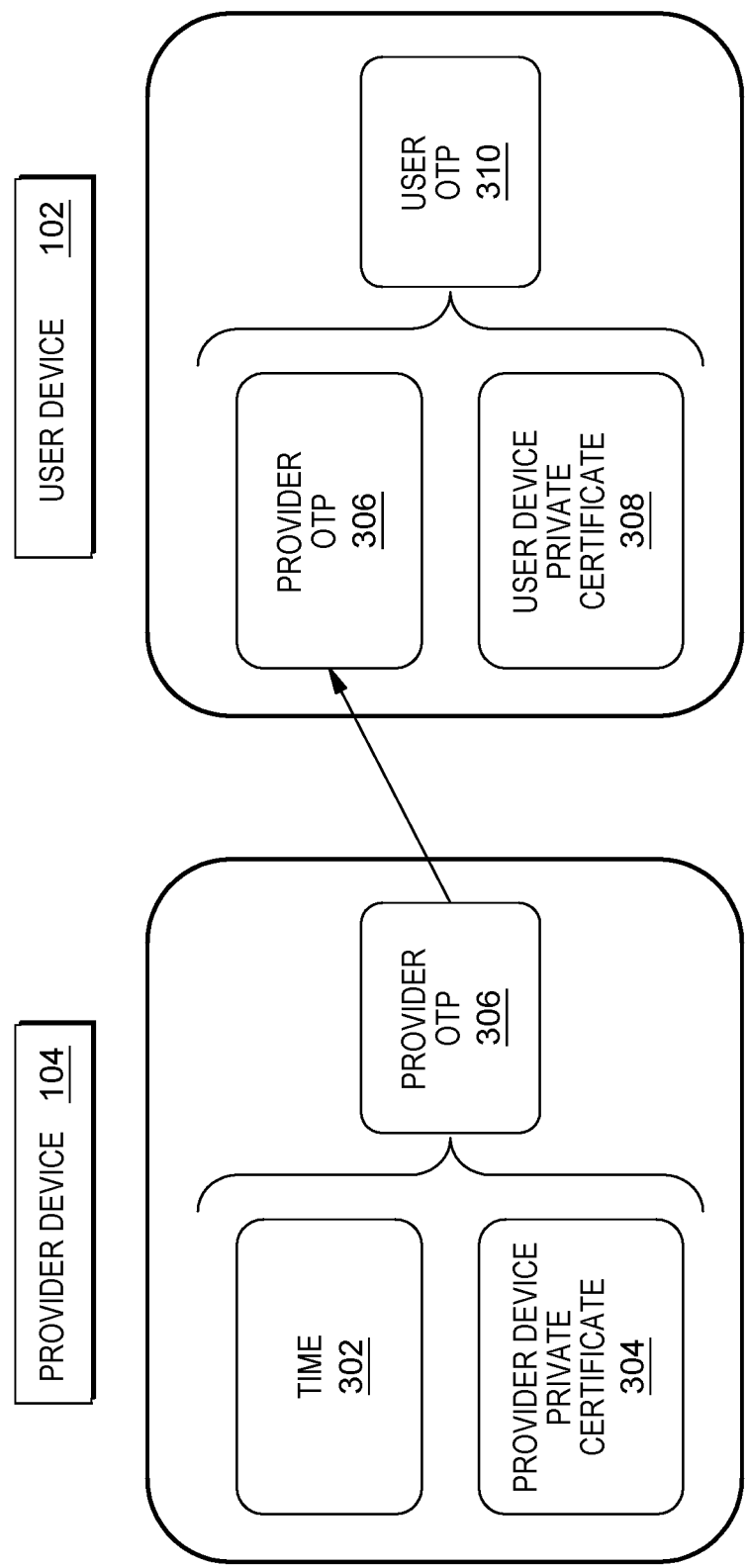
FIG. 3 illustrates an exemplary functional diagram of the transaction module within a provider device of Figure, in accordance with an embodiment of the present disclosure.

FIG. 3 illustrates an exemplary functional diagram of transaction module 112 in accordance with one or more embodiments of the present disclosure.

In the example of FIG. 3, transaction module 112 may generate provider one-time password (OTP) 306 based on time 302 and provider device private certificate 304. When a user requires to perform a transaction, transaction module 112 may generate provider one-time password 306 built from provider device private certificate 304 as well as a timestamp (time 302). Transaction module 112 may generate an optically recognizable code including provider one-time password 306. Transaction module 112 may send provider one-time password 306 to user device 102. User device 102 may scan the optically recognizable code from provide device 104 to obtain provider one-time password 306. User device 102 may generate user one-time password 310 based on user device private certificate as well as provider one-time password 306 received from provider device 104. User device 102 may generate an optical code by using a private key. User device 102 may encode the information based on the capability of provider device 104.

Figure 4:
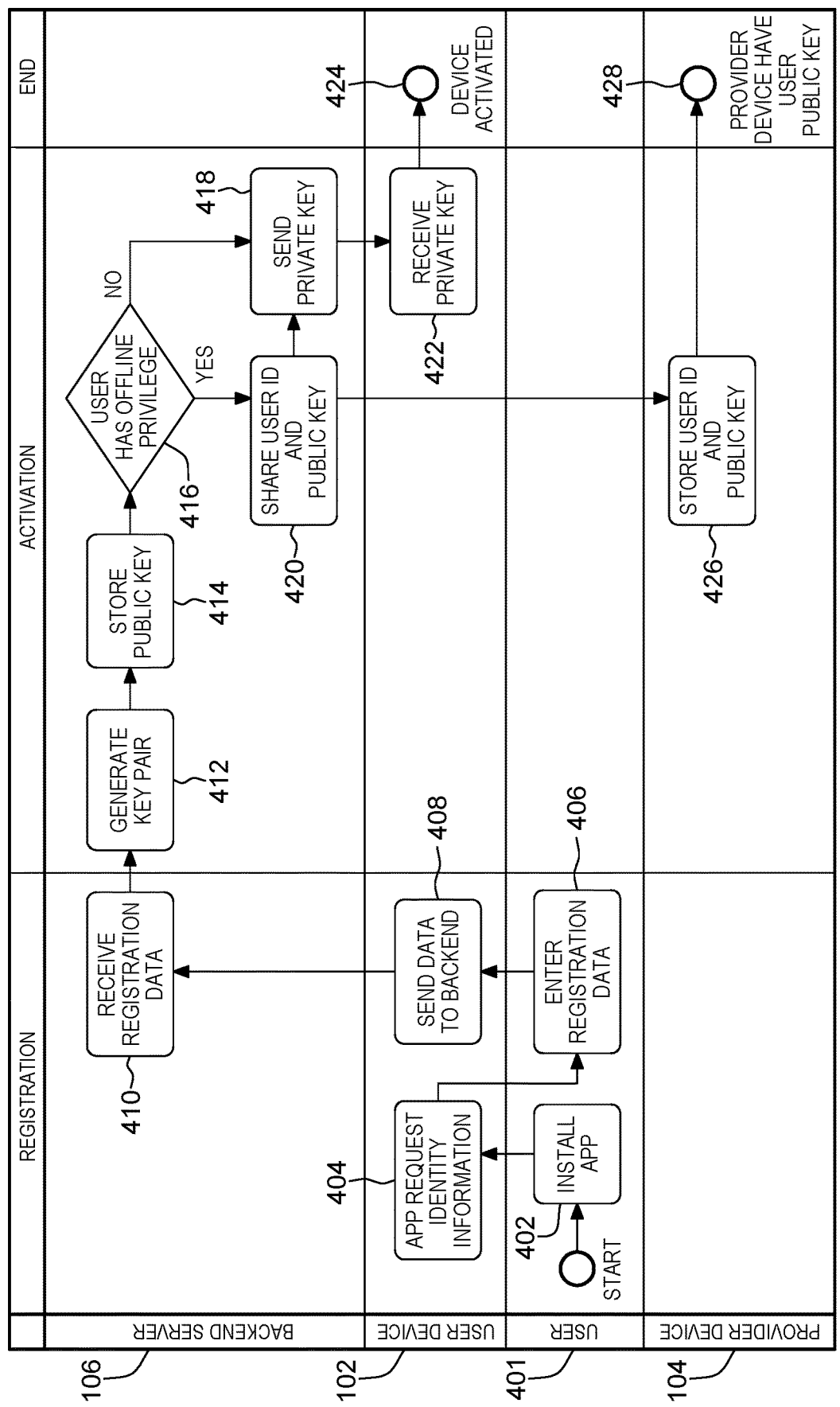
FIG. 4 illustrates an exemplary enrollment process involved with a user device, the provider device, and a backend server within the offline bidirectional transaction environment of FIG. 1, in accordance with one or more embodiments of the present disclosure.

FIG. 4 illustrates an exemplary enrollment process involved with user 401, user device 102, provider device 104, and backend server 106 in offline bidirectional transaction environment 100, in accordance with one or more embodiments of the present disclosure.

In the example of FIG. 4, in block 402, user 401 installs application 102 in user device 102. During the installation of application 110, in block 404, application 110 requests user 401 for registration information, e.g., an email address, a user identifier, a membership identification, personal information. In block 406, user 401 enters all the requested information for the registration process. User 401 can disable this feature or must opt in to have their user information be obtained. User 401 is in control of what type of information is going to be collected and aware of how that information is going to be used. After user device 102 receives the information entered from user 401, in block 408, user device 102 confirms and sends the registration data to backend server 106. In block 410, backend server 106 receives, validates, and stores the registration data. In block 412, backend server 106 generates a key pair for the user, for example, asymmetric keys based on various algorithms. In block 414, backend server 106 stores a public key of user 401. In block 416, backend server 106 determines whether user 401 has an offline transaction privilege or not. If backend server 106 determines that user 401 has an offline transaction privilege, in block 420, backend server 106 shares with provider device 104 the user identifier and the public key of the user to enable offline privilege for the user. In block 426, provider device stores the user identifier and the public key. In block 426, provider device keeps and has the public key of user 401. If backend server 106 determines that user 401 does not have an offline transaction privilege, in block 418, backend server 106 sends a private key to user device 102. Backend server 106 may update the user information as soon as possible to add or remove the users' offline privilege, by removing or adding public keys to provider device 104. In block 422, user device 102 receives the private key. User device 102 may store the private key. In block 424, user device 102 activates application 110.

Figure 5A:
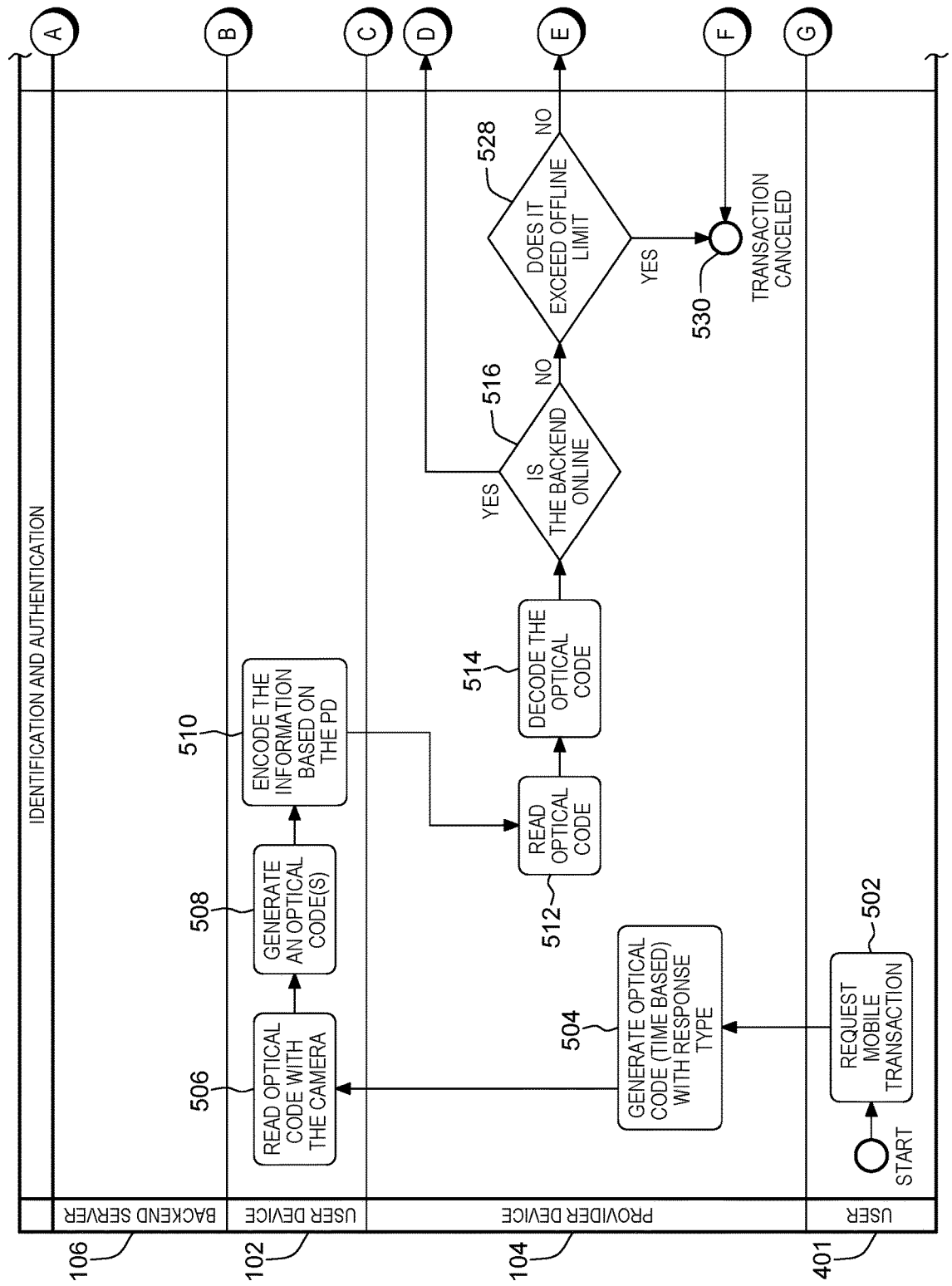
FIGS. 5A-5B illustrate an exemplary functional diagram of the transaction module involved with the user device, the provider device, and the backend server within the offline bidirectional transaction environment of FIG. 1, in accordance with one or more embodiments of the present disclosure.
Figure 5B:
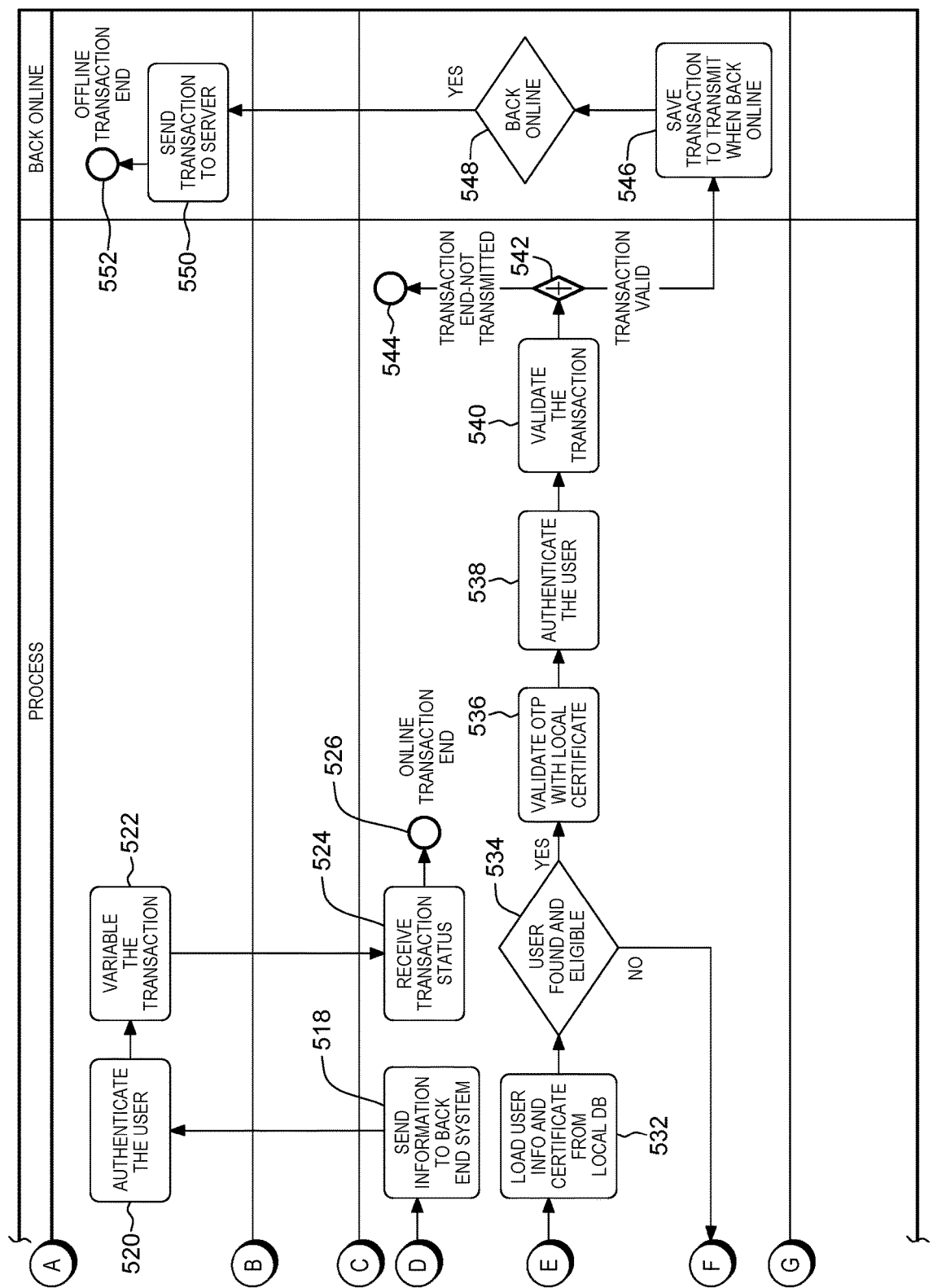

FIGS. 5A-5B illustrate an exemplary functional diagram of transaction module 112 involved with user 401, user device 102, provider device 104, and backend server 106 in offline bidirectional transaction environment 100, in accordance with one or more embodiments of the present disclosure.

In the example of FIGS. 5A-5B, in block 502, user 401 requests a mobile transaction. When provide device 104 receives a transaction request from user 401 associated with user device 102, in block 504, transaction module 112 generates an optical code. The optical code may include the information of a response type, an identity of provider device 104 and a type of optical reader 114 associated with provider device 104. In block 506, user device 102 reads the optical code from provide device 104. In an example, user device 102 may read the optical code from provide device 104 with a built-in camera. User device 102 may extract the one-time password seed and the type of optical capability of provider device 104. User device 102 may encode the information from provider device 104. In block 508, user device 102 generates an optical code based on the user's certificate as well as the one-time password received from provider device 104. In block 510, user device 102 encodes the information based on the capability of provider device 104. In an example, user device 102 may encode an identity and the generated one-time password depending on the capability of provide device 104. In another example, user device 102 may generate multiple optical codes.

In block 512, provider device 104 scans and reads the second optical code generated from user device 102. Provider device 104 receives the encoded information in the second optical code from user device 102. In step 514, provider device 104 decodes the second optical code generated from user device 102. Provider device 104 through transaction module 112 may extract the user identifier and the one-time password associated with user device 102. In block 516, provider device 104 determines whether backend server 106 is online or not. If provider device 104 determines that backend server 106 is online, in block 518, provider device 104 sends to backend server 106 the information including one-time password seed generated from provider device 104, the user identifier, the one-time password associated with user device 102, and additional information associated with the associated transaction (e.g., the amount of transaction). In block 520, backend server 106 authenticates the user based on the received information from provider device 104. In block 522, backend server 106 validates the transaction by applying a predefined business rule. In block 524, provider device 104 receives a status of the associated transaction from backend server 106. For example, backend server 106 may notify provider device 104 of the status of the transaction (e.g., success, funds insufficient, etc.) In block 526, provider device 104 ends and completes the associated transaction.

If provider device 104 determines that backend server 106 is not online or unreachable, in block 528, provider device 104 determines whether an amount of the associated transaction exceeds a predetermined offline limit. If provider device 104 determines that the amount of the associated transaction exceeds the predetermined offline limit, in block 530, provider device 104 cancels the transaction. If provider device 104 determines that the amount of the associated transaction does not exceed the predetermined offline limit, in block 532, provider device 104 loads user information (e.g., a user certificate) from a local repository in provider device 104. In block 534, provider device 104 determines whether the user is found and eligible for the transaction or not (e.g., whether the user certificate associated with the user identifier exist in the local repository, whether the user has the necessary funds, whether provide device 104 has received the user information). If provider device 104 determines that the user is not eligible for the transaction, in block 530, provider device 104 cancels the transaction. If provider device 104 determines that the user is eligible for the transaction, in block 536, provider device 104 validates the one-time password associated with user device 102 with the user certificate using a public certificate associated with provider device 104. Provider device 104 may validate the one-time password associated with user device 102 with a user certificate.

In block 538, provider device 104 authenticates the user based on the validation of the user in block 536. After validating the user certificate, provider device 104 may authenticate user device 102 and may access the user information in provider device 104 (e.g., last known balance). In block 540, provider device 104 validates the associated transaction using a set of predetermined business rules. In block 542, provider device 104 determines whether the transaction is valid. If provider device 104 determines that the transaction is not valid, in block 544, provider device 104 terminates the transaction and does not transmit the transaction to backend server 106. If provider device 104 determines that the transaction is valid, in block 546, provider device registers and stores the associated transaction. In block 548, provider device 104 determines whether backend server is online or not. In block 550, provider device 104 sends the associated transaction information to backend server 106 when backend server 106 is back online. In block 552, the offline transaction ends.

Figure 6:
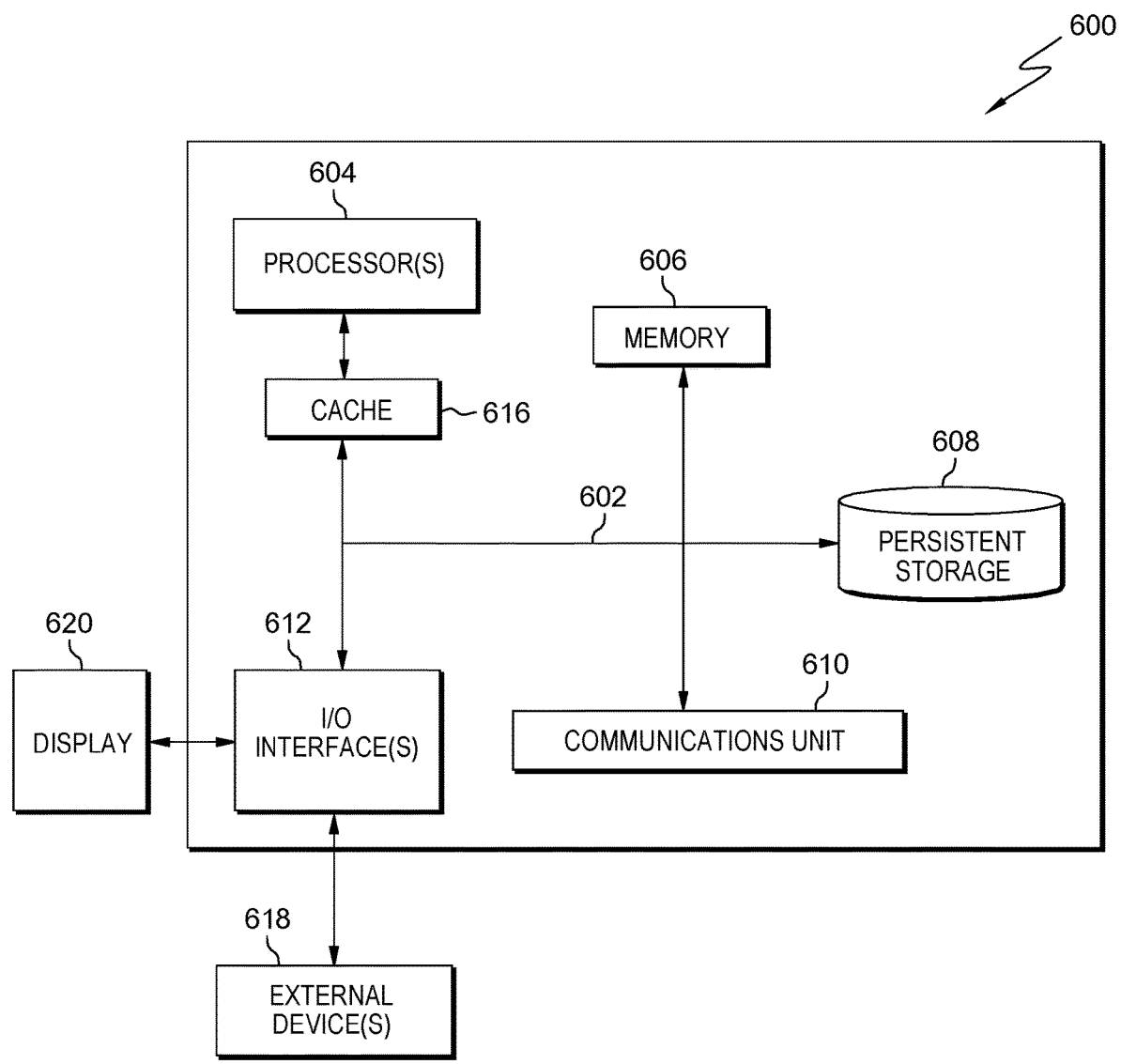
FIG. 6 is a block diagram of components of the user device, the provider device, and the backend server of FIG. 1, in accordance with an embodiment of the present disclosure.

FIG. 6 depicts a block diagram 600 of components of user device 102, provider device 104, and backend server 106 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

User device 102, provider device 104, and backend server 106 each may include communications fabric 602, which provides communications between cache 616, memory 606, persistent storage 608, communications unit 610, and input/output (I/O) interface(s) 612. User device 102 and provider device 104 may include an optical reader, for example, a camera. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Transaction module 112 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Transaction module 112 may be downloaded to persistent storage 608 through communications unit 610.

I/O interface(s) 612 allows for input and output of data with other devices that may be connected to user device 102, provider device 104, and backend server 106. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., transaction module 112 can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   registering, by a backend server, a user and a second device associated with the user for an offline transaction privilege of the user associated with a user identifier, by generating a public certificate of the user and sharing the public certificate with a first device;
   storing a user certificate associated with the user identifier in a local repository of the first device;
   receiving, by the first device, a request from the registered user associated with the registered second device;
   sending, by the first device to the registered second device, information in an optically recognizable first code including an identity of the first device and a type of optical reader associated with the first device;
   generating, by the second device, encoded information in an optically recognizable second code generated using information including the optically recognizable first code, a one-time password seed, and the type of optical reader associated with the first device, and further the optically recognizable second code being generated using the information including an identity of the second device, the user certificate associated with the user identifier, and a one-time password generated using a private key of the registered second device and the one-time password based on the one-time password seed;
   receiving at the first device, the optically recognizable second code;
   decoding the encoded information in the optically recognizable second code, the decoding including extracting, by a transaction module of the first device including one or more processors, the user identifier and the one-time password associated with the registered second device;
   in response to a determination the backend server is unreachable for electronic communication by the transaction module of the first device, determining that the user certificate exists in the local repository of the first device;
   validating, by the transaction module of the first device, the one-time password associated with the registered second device with the user certificate using the public certificate associated with the first device, the one-time password associated with the registered second device and the one-time password seed; and
   authenticating, by the transaction module, the user.

2. The computer-implemented method of claim 1, further comprising:
   validating, by the one or more processors, an associated transaction using a set of predetermined business rules;
   in response to validating the associated transaction, registering, by the one or more processors, the associated transaction;
   storing, by the one or more processors, information associated with the associated transaction including updated local information associated with the user including the associated transaction and a new balance as evidence; and
   in response to a determination the backend is online, sending, by the one or more processors, the associated transaction to the backend server.

3. The computer-implemented method of claim 1, further comprising:
   in response to a determination the backend is online, initiating, by the one or more processors, a process on the backend to authenticate the user and validate an associated transaction by sending information to the backend including, the one-time password seed, the user identifier, the one-time password associated with the registered second device and additional information associated with the associated transaction; and
   receiving, by the one or more processors, a status of the associated transaction from the backend server.

4. The computer-implemented method of claim 1, further comprising:
   in response to a determination the backend server is not online, determining, by one or more processors, that an amount of an associated transaction does not exceed a predetermined offline limit; and
   in response to a determination the amount of the associated transaction does not exceed the predetermined offline limit, determining, by one or more processors, whether the user certificate associated with the user identifier exists in the local repository.

5. The computer-implemented method of claim 1, wherein sending information in an optically recognizable first code includes generating the information in the optically recognizable first code.

6. The computer-implemented method of claim 1, wherein the optically recognizable first code is selected from the group consisting of: a quick response (QR) code and a bar code.

7. The computer-implemented method of claim 1, wherein an associated transaction is a mobile wallet payment.

8. A computer program product comprising:
   one or more computer readable storage media, and program instructions collectively stored on the one or more computer readable storage media, the program instructions comprising:
   program instructions to register, by a backend server, a user and a second device associated with the user for an offline transaction privilege of the user associated with a user identifier, by generating a public certificate of the user and sharing the public certificate with a first device;
   program instructions to store a user certificate associated with the user identifier in a local repository of the first device;
   program instructions to receive, by the first device, a request from the registered user associated with the registered second device;
   send, by the first device, information in an optically recognizable first code including an identity of the first device and a type of optical reader associated with the first device;

generating, by the second device, encoded information in an optically recognizable second code generated using information including the optically recognizable first code, a one-time password seed, and the type of optical reader associated with the first device, and further the optically recognizable second code being generated using the information including an identity of the second device, the user certificate associated with the user identifier, and a one-time password generated using a private key of the registered second device and the one-time password based on the one-time password seed;

program instructions to receive at the first device, the optically recognizable second code;

program instructions to, to decode the encoded information in the optically recognizable second code, the decoding including extracting, by a transaction module of the first device, the user identifier and the one-time password associated with the registered second device;

program instructions to, in response to a determination the backend server is unreachable for electronic communication by the transaction module of the first device, determine that a user certificate exists in the local repository of the first device;

program instructions to validate by the transaction module of the first device, the one-time password associated with the registered second device with the user certificate using the public certificate associated with the first device, the one-time password associated with the registered second device and the one-time password seed; and program instructions to authenticate, using the transaction module, the user.

9. The computer program product of claim 8, further comprising:

program instructions to validate an associated transaction using a set of predetermined business rules;

program instructions to, in response to validating the associated transaction, register the associated transaction;

program instructions to store information associated with the associated transaction including updated local information associated with the user including the associated transaction and a new balance as evidence; and program instructions to, in response to a determination the backend is online, send the associated transaction to the backend server.

10. The computer program product of claim 8, further comprising:

program instructions to, in response to a determination the backend is online, initiate a process on the backend to authenticate the user and validate an associated transaction by sending information to the backend including, the one-time password seed, the user identifier, the one-time password associated with the registered second device and additional information associated with the associated transaction; and program instructions to receive a status of the associated transaction from the backend server.

11. The computer program product of claim 8, further comprising:

program instructions to, in response to a determination the backend server is not online, determine that an amount of an associated transaction does not exceed a predetermined offline limit; and program instructions to, in response to a determination the amount of the associated transaction does not exceed the predetermined offline limit, determine whether the user certificate associated with the user identifier exists in the local repository.

12. The computer program product of claim 8, wherein program instructions to send information in an optically recognizable first code include program instructions to generate the information in the optically recognizable first code.

13. The computer program product of claim 8, wherein the optically recognizable first code is selected from the group consisting of: a QR code and a bar code.

14. The computer program product of claim 8, wherein an associated transaction is a mobile wallet payment.

15. A computer system comprising:

one or more computer processors, one or more computer readable storage media, and program instructions stored on the one or more computer readable storage media for execution by at least one of the one or more computer processors, the program instructions comprising:

program instructions to register, by a backend server, a user and a second device associated with the user for an offline transaction privilege of the user associated with a user identifier, by generating a public certificate of the user and sharing the public certificate with a first device;

program instructions to store a user certificate associated with the user identifier in a local repository of the first device;

program instructions to receive, by the first device, a request from the registered user associated with the registered second device;

send, by the first device, information in an optically recognizable first code including an identity of the first device and a type of optical reader associated with the first device;

generate, by the second device, encoded information in an optically recognizable second code generated using information including the optically recognizable first code, a one-time password seed, and the type of optical reader associated with the first device, and further the optically recognizable second code being generated using the information including an identity of the second device, the user certificate associated with the user identifier, and a one-time password generated using a private key of the registered second device and the one-time password based on the one-time password seed;

program instructions to receive at the first device, the optically recognizable second code;

program instructions to decode the encoded information in the optically recognizable second code received, the decoding including extracting, by a transaction module of the first device, the user identifier and the one-time password associated with the registered second device;

program instructions to, in response to a determination the backend server is unreachable for electronic communication by the transaction module of the first device, determine that a user certificate exists in the local repository of the first device;

program instructions to validate, by the transaction module of the first device, the one-time password associated with the registered second device with the user certificate using the public certificate associated with the first device, the one-time password associated with the registered second device and the one-time password seed; and program instructions to authenticate, using the transaction module, the user.

16. The computer system of claim 15, further comprising:

program instructions to validate an associated transaction using a set of predetermined business rules;

program instructions to, in response to validating the associated transaction, register the associated transaction;

program instructions to store information associated with the associated transaction including updated local information associated with the user including the associated transaction and a new balance as evidence; and program instructions to, in response to a determination the backend is online, send the associated transaction to the backend server.

17. The computer system of claim 15, further comprising:

program instructions to, in response to a determination the backend is online, initiate a process on the backend to authenticate the user and validate an associated transaction by sending information to the backend including, the one-time password seed, the user identifier, the one-time password associated with the registered second device and additional information associated with the associated transaction; and program instructions to receive a status of the associated transaction from the backend server.

18. The computer system of claim 15, further comprising:

program instructions to, in response to a determination the backend server is not online, determine that an amount of an associated transaction does not exceed a predetermined offline limit; and program instructions to, in response to a determination the amount of the associated transaction does not exceed the predetermined offline limit, determine whether the user certificate associated with the user identifier exists in the local repository.

19. The computer system of claim 15, wherein program instructions to send information in an optically recognizable first code include program instructions to generate the information in the optically recognizable first code.

20. The computer system of claim 15, wherein the optically recognizable first code is selected from the group consisting of: a QR code and a bar code.

* * * * *